United States Patent
Ok et al.

(10) Patent No.: US 12,463,273 B2
(45) Date of Patent: Nov. 4, 2025

(54) BATTERY MODULE, BATTERY RACK COMPRISING SAME, AND POWER STORAGE DEVICE

(71) Applicant: LG ENERGY SOLUTION, LTD., Seoul (KR)

(72) Inventors: Seung-Min Ok, Daejeon (KR); Sung-Goen Hong, Daejeon (KR); Hyeok Namgoung, Daejeon (KR); Kyung-Hyun Bae, Daejeon (KR); Jin-Kyu Shin, Daejeon (KR); Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 597 days.

(21) Appl. No.: 17/624,899

(22) PCT Filed: Feb. 4, 2021

(86) PCT No.: PCT/KR2021/001505
§ 371 (c)(1),
(2) Date: Sep. 21, 2022

(87) PCT Pub. No.: WO2021/172785
PCT Pub. Date: Sep. 2, 2021

(65) Prior Publication Data
US 2023/0223621 A1    Jul. 13, 2023

(30) Foreign Application Priority Data
Feb. 27, 2020   (KR) .................. 10-2020-0024457

(51) Int. Cl.
*H01M 50/143*   (2021.01)
*H01M 50/186*   (2021.01)
(Continued)

(52) U.S. Cl.
CPC ....... *H01M 50/143* (2021.01); *H01M 50/186* (2021.01); *H01M 50/193* (2021.01); *H01M 50/204* (2021.01)

(58) Field of Classification Search
CPC . H01M 50/186; H01M 50/143; H01M 50/193
See application file for complete search history.

(56) References Cited

U.S. PATENT DOCUMENTS

2013/0134928 A1   5/2013   Uchihashi et al.
2014/0335388 A1   11/2014  Jin
(Continued)

FOREIGN PATENT DOCUMENTS

CN    103682188 A   3/2014
EP    2 755 275 A2   7/2014
(Continued)

OTHER PUBLICATIONS

International Search Report (PCT/ISA/210) issued in PCT/KR2021/001505 mailed on May 12, 2021.
(Continued)

*Primary Examiner* — Kenneth J Douyette
(74) *Attorney, Agent, or Firm* — Birch, Stewart, Kolasch & Birch, LLP

(57) ABSTRACT

A battery module includes a cell assembly including a plurality of secondary batteries, a module housing in which the cell assembly is received in an internal space, the module housing having an opening through which the internal space is in communication with an external space, and an adjustment cover configured to cover at least a part of the opening to fill a fire extinguishing agent supplied into the battery module to a predetermined height or above.

12 Claims, 13 Drawing Sheets

(51) Int. Cl.
H01M 50/193 (2021.01)
H01M 50/204 (2021.01)

(56) References Cited

U.S. PATENT DOCUMENTS

| | | | |
|---|---|---|---|
| 2015/0147602 A1* | 5/2015 | Bianchi | B65D 81/2076 |
| | | | 429/50 |
| 2018/0108892 A1 | 4/2018 | Kim et al. | |
| 2018/0241092 A1* | 8/2018 | Goitsuka | A62C 35/10 |
| 2019/0351268 A1 | 11/2019 | Lee | |

FOREIGN PATENT DOCUMENTS

| | | |
|---|---|---|
| JP | 3002001 B2 | 1/2000 |
| JP | 2009-154826 A | 7/2009 |
| JP | 2011-173447 A | 9/2011 |
| JP | 2013-131416 A | 7/2013 |
| JP | 2013-246920 A | 12/2013 |
| JP | 2015-220176 A | 12/2015 |
| KR | 10-2013-0056932 A | 5/2013 |
| KR | 10-1362180 B1 | 2/2014 |
| KR | 10-2016-0058674 A | 5/2016 |
| KR | 10-1940496 B1 | 1/2019 |
| KR | 10-2030726 B1 | 10/2019 |
| WO | WO 2012/015002 A1 | 2/2012 |

OTHER PUBLICATIONS

Extended European Search Report for European Application No. 21760696.1, dated May 15, 2024.

\* cited by examiner

BATTERY MODULE, BATTERY RACK COMPRISING SAME, AND POWER STORAGE DEVICE

TECHNICAL FIELD

The present disclosure relates to a battery module, a battery rack comprising the same and an energy storage system, and more particularly, to a battery module with reduced risk of fire propagation or explosion.

The present application claims the benefit of Korean Patent Application No. 10-2020-0024457 filed on Feb. 27, 2020 with the Korean Intellectual Property Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging may be done whenever it is convenient, the self-discharge rate is very low and the energy density is high.

A lithium secondary battery primarily uses lithium-based oxide and a carbon material as a positive electrode active material and a negative electrode active material respectively. The lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery pouch case in which the electrode assembly is hermetically received together with an electrolyte solution.

Recently, secondary batteries are widely used in not only small devices such as portable electronic devices, but also medium- and large-scale devices such as vehicles and energy storage systems. For use in medium- and large-scale device applications, many secondary batteries are electrically connected to increase the capacity and output. In particular, pouch-type secondary batteries are widely used in medium- and large-scale devices due to their easy-to-stack advantage.

More recently, with the use as a source of energy and the growing need for large-capacity structures, there is an increasing demand for a battery module including a plurality of secondary batteries electrically connected in series and/or in parallel and a module housing in which the plurality of secondary batteries is received.

However, when any of the secondary batteries included in the battery module burns or explodes, heat or flames may spread to adjacent secondary batteries, causing a larger explosion, and efforts have been made to prevent fire propagation or explosions.

Furthermore, flames from the burning secondary battery may spread to adjacent secondary batteries through a gas passageway designed to discharge gas, so its prevention technology is needed.

DISCLOSURE

Technical Problem

The present disclosure is designed to solve the above-described problem, and therefore the present disclosure is directed to providing a battery module with reduced risk of fire propagation or explosion.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery module according to the present disclosure includes a cell assembly including a plurality of secondary batteries, a module housing in which the cell assembly is received in an internal space, the module housing having at least one opening through which the internal space is in communication with an external space, and an adjustment cover configured to cover at least a part of the at least one opening to fill a fire extinguishing agent supplied into the module housing to a predetermined height or above.

Additionally, the adjustment cover may be disposed outside of the at least one opening, and may have an end connected to an outer surface of the module housing.

Moreover, the adjustment cover may have an open top.

Furthermore, the at least one opening may include an inlet through which outside air enters the module housing, and an outlet formed in a part of the module housing to allow inside air to exit.

Further, the adjustment cover may be provided at each of the inlet and the outlet.

Additionally, the battery module may be configured to supply the fire extinguishing agent into the module housing when an internal temperature of the module housing rises above a predetermined temperature, and the adjustment cover may include a sealing element configured to seal a top of the adjustment cover by the fire extinguishing agent supplied to the battery module.

Additionally, the sealing element may include a cap configured to seal the top of the adjustment cover by buoyancy when the fire extinguishing agent is supplied to the battery module.

Further, the sealing element may further include a stopper provided at a top of the adjustment cover to prevent the adjustment cover from being forced out of the adjustment cover by the fire extinguishing agent, and a fixation cord connected to the cap.

Additionally, the sealing element may include a synthetic fiber configured to absorb the fire extinguishing agent and expand in volume to close at least a part of the opening when the synthetic fiber contacts the fire extinguishing agent supplied into the module housing.

Additionally, to achieve the above-described object, a battery rack according to the present disclosure includes the battery module and a rack case in which the battery module is received.

Additionally, to achieve the above-described object, an energy storage system according to the present disclosure includes at least two battery racks.

Advantageous Effects

According to an aspect of the present disclosure, the present disclosure includes the adjustment cover which covers at least a part of the opening formed in the module housing to fill the fire extinguishing agent supplied into the battery module to a predetermined height or above, so when the battery module rises above a predetermined temperature or the fire extinguishing agent is supplied into the module housing in the event of a fire, the fire extinguishing agent supplied into the battery module may be filled to the predetermined height or above, thereby rapidly cooling the secondary battery in which thermal runaway occurred and putting out the fire in the secondary battery quickly. Accordingly, the present disclosure may greatly increase the fire safety.

Additionally, according to an aspect of another embodiment of the present disclosure, the battery module of the present disclosure includes the sealing element configured to close at least a part of the opening by the fire extinguishing agent supplied to the battery module, thereby preventing the fire extinguishing agent from leaking out of the adjustment cover when the fire extinguishing agent is supplied to the battery module. That is, it is possible to increase the level of the fire extinguishing agent supplied into the module housing. Accordingly, it is possible to cool the secondary battery in which thermal runaway occurred and put out the fire in the secondary battery quickly. Accordingly, the present disclosure may greatly increase the fire safety.

BRIEF DESCRIPTION OF THE DRAWINGS

The accompanying drawings illustrate preferred embodiments of the present disclosure, and together with the following detailed description, serve to provide a further understanding of the technical spirit of the present disclosure. However, the present disclosure is not to be construed as being limited to the drawings.

DETAILED DESCRIPTION

Figure 1:
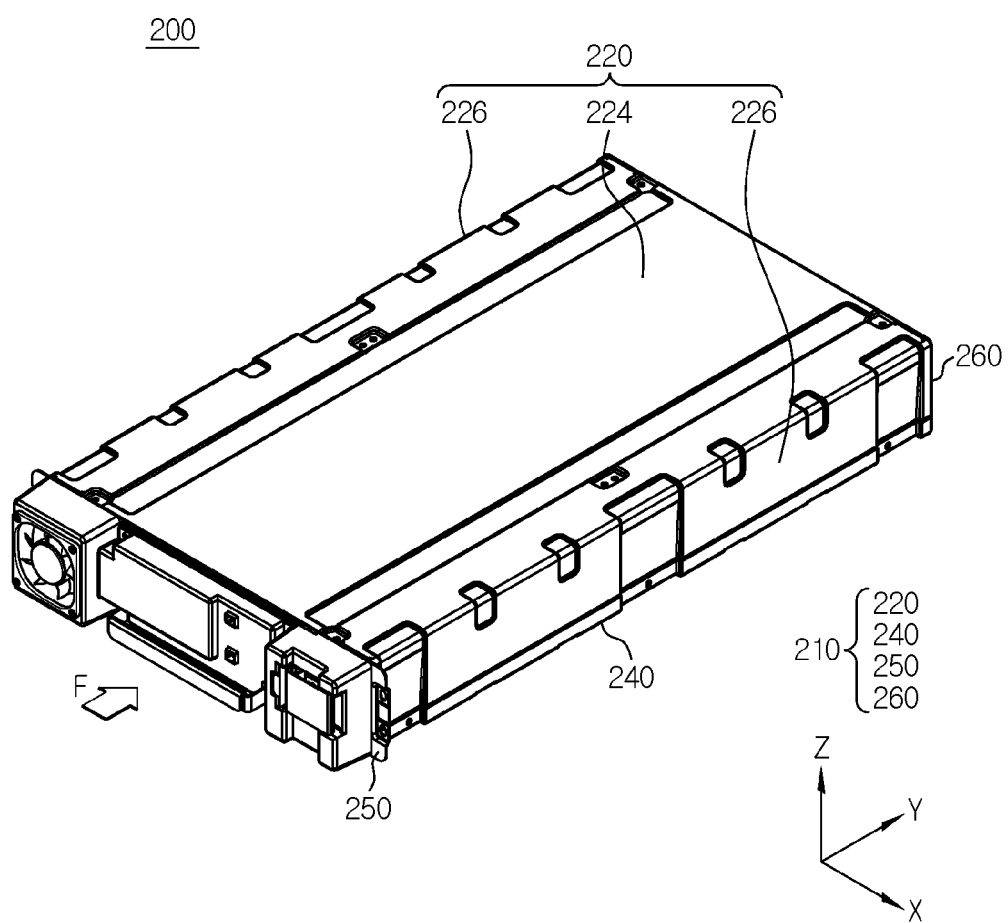
FIG. 1 is a schematic perspective view of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
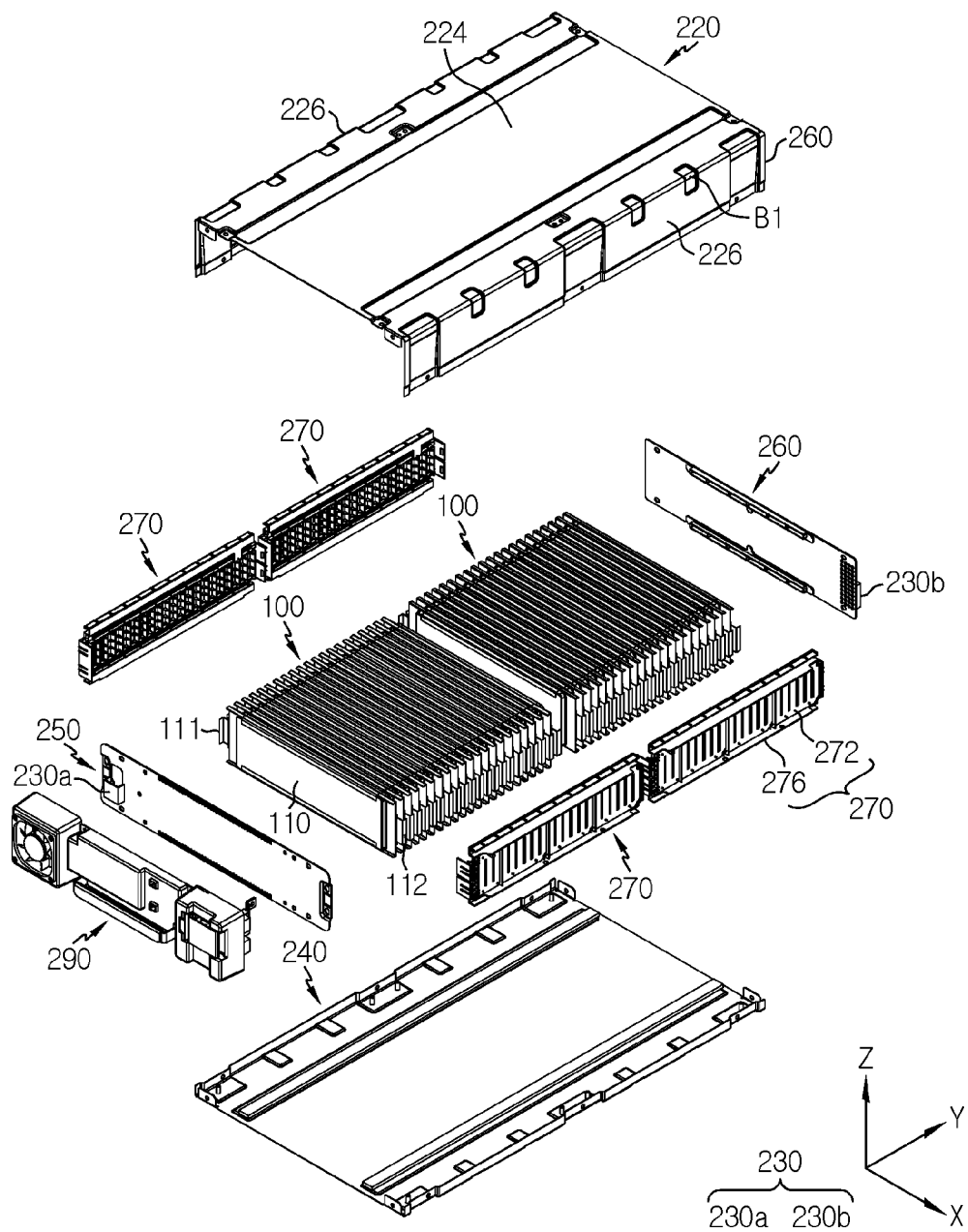
FIG. 2 is a schematic exploded perspective view of components of a battery module according to an embodiment of the present disclosure.
Figure 3:
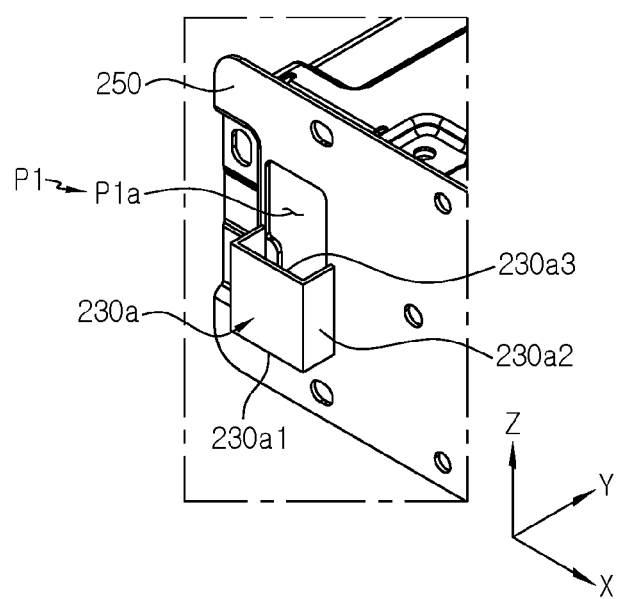
FIG. 3 is a schematic partial perspective view of components of a battery module according to an embodiment of the present disclosure.
Figure 4:
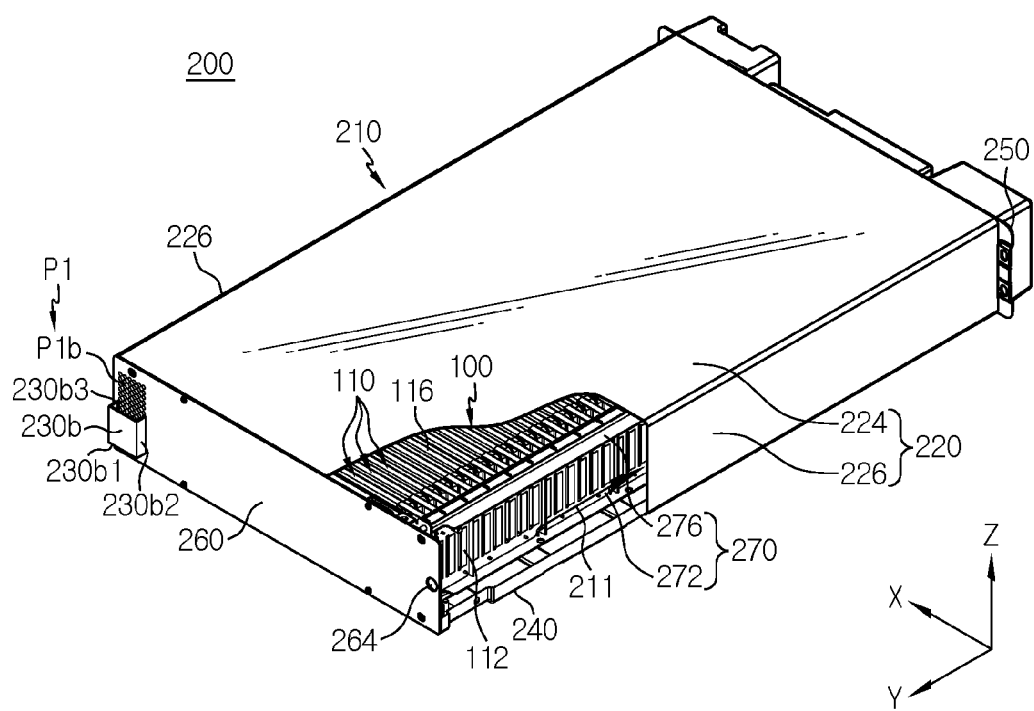
FIG. 4 is a schematic rear perspective view of a battery module according to an embodiment of the present disclosure.

FIG. 1 is a schematic perspective view of a battery module according to an embodiment of the present disclosure. FIG. 2 is a schematic exploded perspective view of the components of the battery module according to an embodiment of the present disclosure. FIG. 3 is a schematic partial perspective view of the components of the battery module according to an embodiment of the present disclosure. FIG. 4 is a schematic rear perspective view of the battery module according to an embodiment of the present disclosure.

Referring to FIGS. 1 to 4, the battery module 200 according to an embodiment of the present disclosure includes a cell assembly 100, a module housing 210 and an adjustment cover 230.

Here, the cell assembly 100 may include a plurality of secondary batteries 110 stacked in the front-rear direction. The secondary battery 110 may be a pouch-type secondary battery 110. For example, as shown in FIG. 2, each of two cell assemblies 100 may include 21 pouch-type secondary batteries 110 stacked side by side in the front-rear direction (Y direction).

In particular, the pouch-type secondary battery 110 may include an electrode assembly (not shown), an electrolyte solution (not shown) and a pouch 116.

Each secondary battery 110 may be arranged upright in a direction (Z direction) approximately perpendicular to the ground with two wide surfaces disposed in the front-rear direction and sealing portions disposed in the up, down, left and right directions, when viewed from the direction F (shown in FIG. 1). In other words, each secondary battery 110 may stand upright in the vertical direction. In the specification, unless otherwise specified, the up, down, front, rear, left, and right directions are defined when viewed from the direction F.

Here, the pouch 116 may have a concave receiving portion. The electrode assembly and the electrolyte solution may be received in the receiving portion. Each pouch may include an outer insulating layer, a metal layer and an inner adhesive layer, and the inner adhesive layers adhere to each other at the edges of the pouch to form a sealing portion. A terrace portion may be formed at each of the left and right ends (X direction) at which a positive electrode lead 111 and a negative electrode lead 112 of the secondary battery 110 are formed.

The electrode assembly may be an assembly of an electrode plate coated with an electrode active material and a separator, and may include at least one positive electrode plate and at least one negative electrode plate with the separator interposed between. The positive electrode plate of the electrode assembly may have a positive electrode tab, and at least one positive electrode tab may be connected to the positive electrode lead 111.

Here, the positive electrode lead 111 may have one end connected to the positive electrode tab and the other end exposed through the pouch 116, and the exposed portion may serve as an electrode terminal of the secondary battery 110, for example, a positive electrode terminal of the secondary battery 110.

The negative electrode plate of the electrode assembly may have a negative electrode tab, and at least one negative electrode tab may be connected to the negative electrode lead 112. The negative electrode lead 112 may have one end connected to the negative electrode tab and the other end exposed through the pouch, and the exposed portion may serve as an electrode terminal of the secondary battery 110, for example, a negative electrode terminal of the secondary battery 110.

As shown in FIG. 1, when viewed from the direction F, the positive electrode lead 111 and the negative electrode lead 112 may be formed at the left and right ends in opposite directions (X direction) with respect to the center of the secondary battery 110. That is, the positive electrode lead 111 may be provided at one end with respect to the center of the secondary battery 110. The negative electrode lead 112 may be provided at the other end with respect to the center of the secondary battery 110.

For example, as shown in FIG. 2, each secondary battery 110 of the cell assembly 100 may have the positive electrode lead 111 and the negative electrode lead 112 extending in the left-right direction.

Here, the terms representing the directions such as front, rear, left, right, up, and down may vary depending on the position of the observer or the placement of the object. However, in the specification, for convenience of description, the front, rear, left, right, up, and down directions are defined when viewed from the direction F.

According to this configuration of the present disclosure, it is possible to increase the area of the electrode lead 111 without interference between the positive electrode lead 111 and the negative electrode lead 112 in one secondary battery 110.

The positive electrode lead 111 and the negative electrode lead 112 may be formed in a plate shape. In particular, the positive electrode lead 111 and the negative electrode lead 112 may extend in the horizontal direction (X direction) with the wide surfaces standing upright in the front-rear direction.

Here, the horizontal direction refers to a direction parallel to the ground when the secondary battery 110 is placed on the ground, and may be referred to as at least one direction on a plane perpendicular to the vertical direction.

However, the battery module 200 according to the present disclosure is not limited to the pouch-type secondary battery 110 described above and may use various types of secondary batteries 110 known at the time of filing the application.

The at least one cell assembly 100 may be arranged in the front-rear direction. For example, as shown in FIG. 2, two cell assemblies 100 may be arranged in the front-rear direction, and the two cell assemblies 100 may be spaced a predetermined distance apart from each other.

The battery module 200 of the present disclosure may further include a busbar assembly 270. The busbar assembly 270 may include a busbar 272 and a busbar frame 276 configured to mount the busbar 272. The busbar 272 may be configured to electrically connect the plurality of secondary batteries 110 to one another. The busbar 272 may have an electrically conductive metal. The metal may include aluminum, copper and nickel. For example, the busbar 272 may be joined to the positive electrode lead 111 and/or the negative electrode lead 112 of the secondary battery 110.

The module housing 210 may have an internal space to receive the cell assembly 100 therein. Specifically, the module housing 210 may include a top cover 220, a base plate 240, a front plate 250 and a rear plate 260.

Specifically, the base plate 240 may have a greater area than the size of the lower surface of the at least one cell assembly 100 to mount the at least one cell assembly 100 on top. The base plate 240 may be in the shape of a plate that horizontally extends.

The top cover 220 may include a top portion 224 and a side portion 226. The top portion 224 may be in the shape of a plate that horizontally extends to cover the top of the cell assembly 100. The side portion 226 may be in the shape of a plate that extends down from the left and right ends of the top portion 224 to cover the left and right sides of the cell assembly 100.

The side portion 226 may be coupled to a part of the base plate 240. For example, as shown in FIG. 2, the top cover 220 may include the top portion 224 in the shape of a plate that extends in the front-rear and left-right directions.

Further, the top cover 220 may include two side portions 226 extending down from each of the left and right ends of the top portion 224. Further, the lower ends of the two side portions 226 may be coupled to the left and right ends of the base plate 240 respectively. In this instance, the coupling may be male-female coupling or weld coupling.

Further, a beading portion B1 that extends inward to the secondary battery 110 may be provided at a part of the side portion 226. For example, as shown in FIG. 2, one side portion 226 may have eight beading portions B1 that extend inward.

The front plate 250 may be configured to cover the front side of the cell assembly 100. For example, the front plate 250 may be in the shape of a plate having a larger size than the size of the front side of the secondary battery 110. The plate shape may be upright in the vertical direction.

Further, a part of the outer periphery of the front plate 250 may be coupled to the base plate 240. For example, the lower part of the outer periphery of the front plate 250 may be coupled to the front end of the base plate 240. Further, the upper part of the outer periphery of the front plate 250 may be coupled to the front end of the top cover 220. Here, the coupling may be bolt coupling.

The rear plate 260 may be configured to cover the rear side of the cell assembly 100. For example, the rear plate 260 may be in the shape of a plate having a larger size than the size of the rear side of the secondary battery 110.

Additionally, a part of the outer periphery of the rear plate 260 may be coupled to the base plate 240. For example, the lower part of the outer periphery of the rear plate 260 may be coupled to the rear end of the base plate 240. Further, the upper part of the outer periphery of the rear plate 260 may be coupled to the rear end of the top cover 220. Here, the coupling may be bolt coupling. The rear plate 260 may have an outlet P1b to allow the outside air to enter or the inside air to exit.

Additionally, the module housing 210 may have an opening P1 through which the internal space is in communication with an external space. The opening P1 may include an inlet P1a and the outlet P1b. For example, as shown in FIG. 3, the front plate 250 may have the inlet P1a through which the outside air enters the module housing 210. For example, as shown in FIG. 4, the outlet P1b may be formed in a part of the rear plate 260 of the module housing 210 to allow the inside air to exit. In this instance, the outlet P1b may have a plurality of holes.

According to this configuration of the present disclosure, the module housing 210 has a structure that can stably protect the secondary battery 110 from an external impact, thereby increasing the safety of the battery module 200 from an external impact.

The battery module 200 of the present disclosure may further include a module battery management system (BMS) 290 configured to control the charge/discharge of the cell assembly 100. The module BMS 290 may include various types of sensors and electric circuits to detect the temperature and current of the battery module 200. The illustration of the sensor and circuit is omitted in the drawing.

Figure 5:
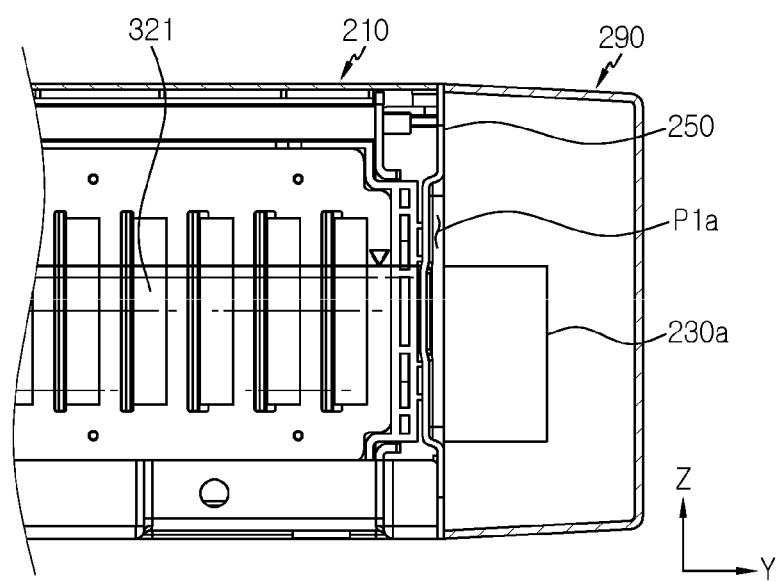
FIG. 5 is a schematic partial left side view of an inner part of a battery module according to an embodiment of the present disclosure.
Figure 6:
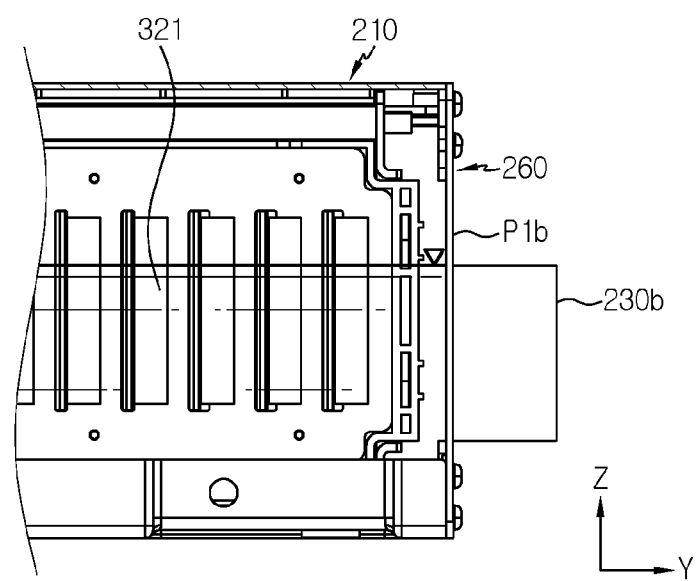
FIG. 6 is a schematic partial right side view of an inner part of a battery module according to an embodiment of the present disclosure.

FIG. 5 is a schematic partial left side view of the inner part of the battery module according to an embodiment of the present disclosure. FIG. 6 is a schematic partial right side view of the inner part of the battery module according to an embodiment of the present disclosure.

Referring to FIGS. 5 and 6 together with FIGS. 2 to 4, the adjustment cover 230 may be configured to fill a fire extinguishing agent 321 supplied into the battery module 200 to a predetermined height or above. For example, the adjustment cover 230 may be configured to cover at least a part of the opening P1 outside the opening P1. That is, the adjustment cover 230 may be configured to surround at least a part of the opening P1. In this instance, a part of the adjustment cover 230 may be open to outside to allow air in the module housing 210 to exit or allow the outside air to enter the module housing 210.

Additionally, the adjustment cover 230 may be disposed outside of the opening P1, and have an end connected to the outer surface of the module housing 210. For example, as shown in FIG. 3, the adjustment cover 230a may be in the shape of a cup that extends from the outer surface of the front plate 250. The adjustment cover 230a may be closed at bottom 230a1 and side 230a2 and open at top 230a3. That is, the bottom 230a1 and the side 230a2 of the adjustment cover 230a may be connected to the outer surface of the front plate 250. The open top 230a3 of the adjustment cover 230a may allow the outside air to move through the opening P1.

For example, as shown in FIG. 4, the adjustment cover 230b may be in the shape of a cup that extends from the outer surface of the rear plate 260. That is, the bottom 230b1 and the side 230b2 of the adjustment cover 230b may be connected to the outer surface of the rear plate 260. The open top 230b3 of the adjustment cover 230b may allow the outside air to move through the opening P1 formed in the rear plate 260.

According to this configuration of the present disclosure, the present disclosure includes the adjustment cover 230 configured to cover at least a part of the opening P1 to fill the fire extinguishing agent 321 supplied into the battery module 200 to a predetermined height or above, so when the battery module 200 rises above the predetermined temperature or the fire extinguishing agent 321 is supplied into the module housing 210 in the event of a fire, the fire extinguishing agent 321 supplied into the battery module 200 may be filled to the predetermined height or above, thereby cooling the secondary battery 110 in which thermal runaway occurred and putting out the fire in the secondary battery 110 quickly. Accordingly, the present disclosure may greatly increase the fire safety.

Furthermore, as shown in FIGS. 2, 5 and 6, when a fire occurs in some of the plurality of cell assemblies 100 embedded in the battery module 200, the present disclosure may supply the fire extinguishing agent 321 to a gas passageway (211 in FIG. 2) of the module housing 210, thereby preventing the propagation of flames and high temperature gas to the other cell assembly 100 through the gas passageway 211.

More specifically, the adjustment cover 230 may be provided in each of the inlet P1a and the outlet P1b. For example, as shown in FIG. 3, the present disclosure may include the adjustment cover 230 outside of the inlet P1a formed in the front plate 250. For example, as shown in FIG. 4, the present disclosure may include the adjustment cover 230 which covers the middle and the bottom of the outlet P1b formed in the rear plate 260.

Figure 7:
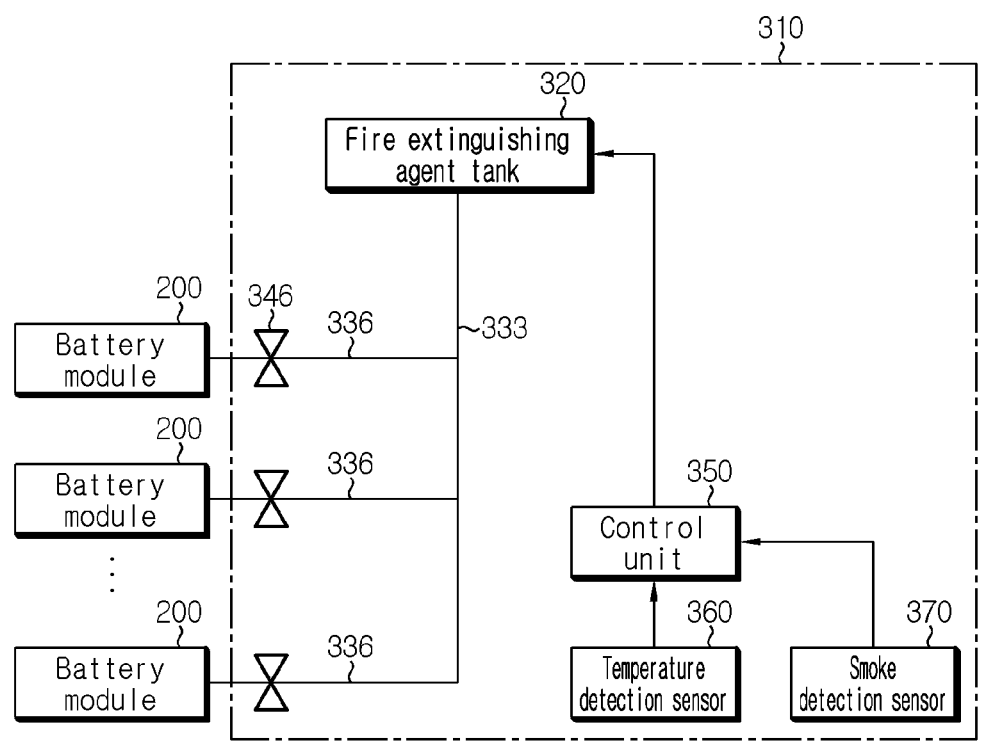
FIG. 7 is a conceptual diagram of components of a battery module according to another embodiment of the present disclosure.
Figure 8:
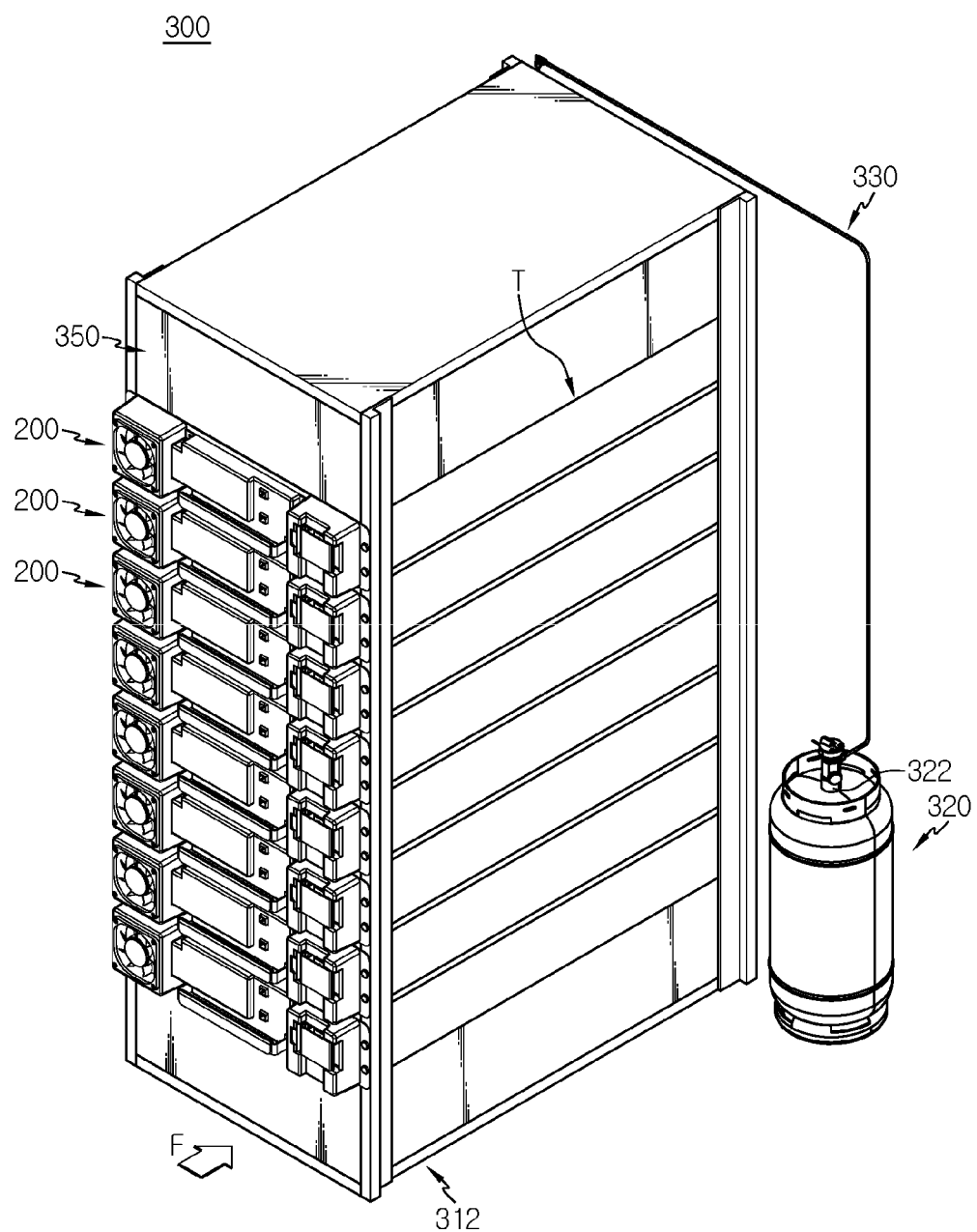
FIG. 8 is a schematic perspective view of a battery rack according to an embodiment of the present disclosure.

FIG. 7 is a conceptual diagram of the components of a battery module according to another embodiment of the present disclosure. Additionally, FIG. 8 is a schematic perspective view of a battery rack according to an embodiment of the present disclosure. For reference, in FIG. 8, the horizontal and vertical directions are described with respect to the direction F.

Referring to FIGS. 7 and 8 together with FIGS. 4 to 6, when the internal temperature of the module housing 210 rises above the predetermined temperature, the battery module 200 may be configured to supply the fire extinguishing agent 321 into the module housing 210. For example, the battery rack 300 including a plurality of battery module 200 may further include a fire extinguishing unit 310.

Here, the fire extinguishing unit 310 may include a fire extinguishing agent tank 320, a pipe 330 and a valve 346.

First, the fire extinguishing agent tank 320 may store the fire extinguishing agent (not shown). For example, the fire extinguishing agent may be at least one of an inorganic salt enriched solution such as potassium carbonate, a chemical foam, an air foam, carbon dioxide or water. Additionally, the fire extinguishing agent tank 320 may include compressed gas to spray the fire extinguishing agent with proper pressure or move the fire extinguishing agent along the pipe 330.

For example, when water is included as the fire extinguishing agent, the fire extinguishing agent may further include an additive to increase the cooling capability of the water. For example, the additive may be a thickening agent or a penetrant. For example, the penetrant may be a surfactant. The penetrant may increase the penetration effect of the water by reducing the surface tension of the water.

For example, the capacity of the fire extinguishing agent tank 320 may be 59 L, the compressed gas may be 8 bar nitrogen, and the fire extinguishing agent may be 40 L of water. Here, in case that water is used as the fire extinguishing agent, water has a cooling and fire extinguishing effect and a heat shielding effect when sprayed into the battery module 200, so especially when high temperature gas and flames are generated due to thermal runaway, it is effective in preventing thermal propagation. Accordingly, it is possible to effectively prevent the propagation of fires or thermal runaway between the plurality of cell assemblies 100.

Additionally, the fire extinguishing agent stored in the fire extinguishing agent tank 320 may be moved from the fire extinguishing agent tank 320 to each of the plurality of battery modules 200.

The pipe 330 may be configured to be connected to supply the fire extinguishing agent from the fire extinguishing agent tank 320 to each of the at least two battery modules 200. For example, the pipe 330 may have a material having resistance to corrosion by water. For example, the pipe 330 may have stainless steel. One end of the pipe 330 may be connected to an outlet 322 of the fire extinguishing agent tank 320. The other end of the pipe 330 may extend into each of the at least two battery modules 200.

For example, the pipe 330 may include a common pipe 333 connected to the outlet 322 through which the fire extinguishing agent in the fire extinguishing agent tank 320 is forced out, and a distribution pipe 336 of distributed structure connected from the common pipe 333 to an inlet (264 in FIG. 4) provided in each of the at least two battery modules 200. For example, as shown in FIG. 7, the pipe 330 may include one common pipe 333 connected to the outlet 322 of the fire extinguishing agent tank 320, and a plurality of distribution pipes 336 branched off from the common pipe 333. Additionally, the plurality of distribution pipes 336 may be connected to the inlets 264 of eight battery modules 200. That is, since the distribution pipe 336 is connected to the inlet 264 of the module housing 210, the fire extinguishing agent in the fire extinguishing agent tank 320 may be injected into the battery module 200 through the inlet 264. In this instance, the fire extinguishing agent injected through the inlet 264 may first fill the gas passageway (211 in FIG. 4) of the module housing 210.

As shown in FIG. 7, the valve 346 may be configured to supply the fire extinguishing agent from the fire extinguishing agent tank 320 to the battery module 200 having a rise in the internal temperature above the predetermined temperature. When the internal temperature of the battery module 200 is equal to or higher than the predetermined temperature, a control unit 350 may detect the temperature rise and the valve 346 may be actively opened by the control unit 350. In this instance, the control unit 350 may be placed on the topmost battery module T among the plurality of battery modules 200. Here, the predetermined temperature may be 100° C. or above.

The fire extinguishing unit 310 may include the control unit 350. Specifically, when the temperature above the predetermined temperature is detected from a temperature detection sensor 360, the control unit 350 may configured to open the valve 346. For example, when the valve 346 is an active valve, the control unit 350 may be configured to transmit a signal for controlling the active valve. For example, the temperature detection sensor 360 may be a linear temperature detection sensor.

The fire extinguishing unit 310 may further include a smoke detection sensor 370 to detect smoke from the at least two battery modules 200. Specifically, the smoke detection sensor 370 may be disposed on top of the at least two battery modules 200 stacked vertically. That is, when a fire occurs in the battery module 200, it is preferred that the smoke detection sensor 370 is disposed on top of the at least two battery modules 200 since gas given off from the fire moves up.

Additionally, when the smoke detection sensor 370 detects smoke, the control unit 350 of the fire extinguishing unit 310 may be configured to transmit a signal. The control unit 350 may open the valve 346 by the received signal.

Figure 9:
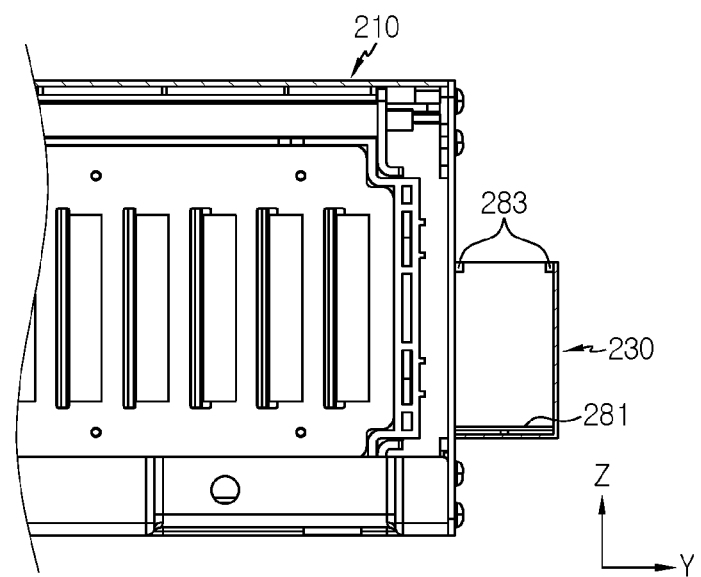
FIGS. 9 and 10 are schematic partial right side views of the operation of a cap of a battery module according to another embodiment of the present disclosure.
Figure 10:
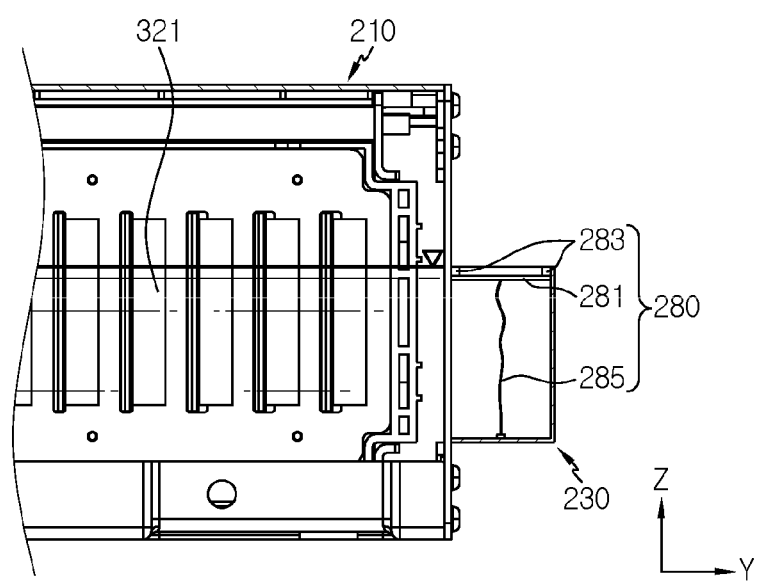

FIGS. 9 and 10 are schematic partial right side views of the operation of a cap of the battery module according to another embodiment of the present disclosure.

Referring to FIGS. 9 and 10 together with FIG. 2, the adjustment cover 230 may include a sealing element 280 configured to seal the top of the adjustment cover 230 by the fire extinguishing agent 321 supplied to the battery module 200. For example, as shown in FIGS. 9 and 10, the sealing element 280 may include a cap 281 configured to seal the top of the adjustment cover 230 by buoyancy when the fire extinguishing agent 321 is supplied to the battery module 200.

That is, the cap 281 may have a size that matches the size of the open top of the adjustment cover 230. Additionally, the cap 281 may have a buoyant material, for example, plastics or Styrofoam, capable of floating in the fire extinguishing agent 321 (water).

According to this configuration of the present disclosure, the adjustment cover 230 includes the sealing element 280 configured to close at least a part of the opening P1 by the fire extinguishing agent 321 supplied to the battery module 200, thereby preventing the fire extinguishing agent 321 from leaking out of the adjustment cover 230 when the fire extinguishing agent 321 is supplied to the battery module 200. That is, it is possible to increase the level of the fire extinguishing agent 321 supplied into the module housing 210. Accordingly, it is possible to cool the secondary battery 110 in which thermal runaway occurred and put out the fire in the secondary battery 110 quickly. Accordingly, the present disclosure may greatly increase the fire safety.

Referring back to FIGS. 9 and 10, the sealing element 280 may include a stopper 283 and a fixation cord 285. The stopper 283 may be provided on top of the adjustment cover 230 to prevent the fire extinguishing agent 321 from leaking out. For example, as shown in FIG. 9, the stopper 283 that extends inward (toward the center) from the inner surface may be provided on top of the inner side of the adjustment cover 230.

The fixation cord 285 may be connected to the lower surface of the cap 281. That is, the fixation cord 285 may be configured to limit the movement range of the cap 281 to prevent the cap 281 from moving out of the adjustment cover 230 when the cap 281 floats by buoyancy as the fire extinguishing agent 321 is supplied into the module housing 210. That is, the length of the fixation cord 285 may be equal to or shorter than the height of the adjustment cover 230.

According to this configuration of the present disclosure, the sealing element 280 includes the stopper 283 provided on top of the adjustment cover 230 to prevent the adjustment cover 230 from being forced out by the fire extinguishing agent 321, and the fixation cord 285 connected to the cap 281, so the cap 281 may prevent the adjustment cover 230 from moving. Accordingly, the sealing element 280 may stably seal the top of the adjustment cover 230, thereby effectively increasing the fire safety of the battery module 200.

Figure 11:
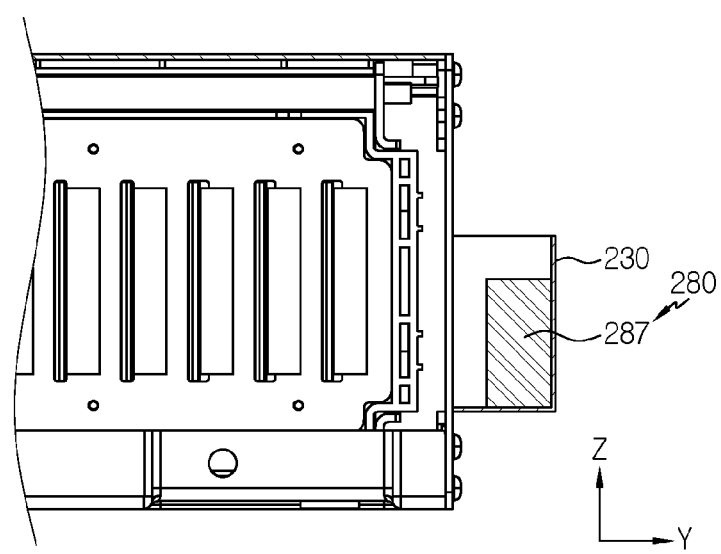
FIGS. 11 and 12 are schematic partial right side views of the operation of synthetic fiber of a battery module according to still another embodiment of the present disclosure.
Figure 12:
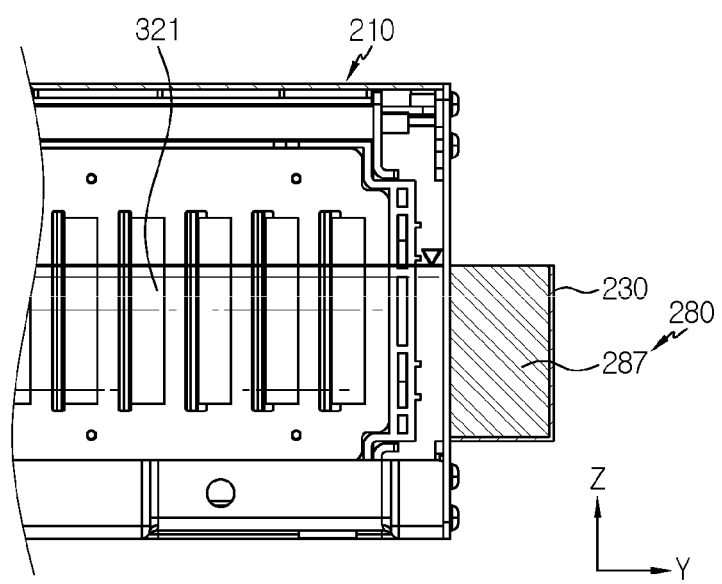

FIGS. 11 and 12 are schematic partial right side views of the operation of synthetic fiber of the battery module according to still another embodiment of the present disclosure.

Referring to FIGS. 11 and 12, the sealing element 280 according to still another embodiment may include the synthetic fiber 287. Here, the synthetic fiber 287 may be in the shape of a rectangular pad. The front and rear surfaces of the synthetic fiber 287 may have a size corresponding to the size of the front or rear surface of the cell assembly 100. When the synthetic fiber 287 absorbs the fire extinguishing agent 321, the synthetic fiber 287 may have a size change by volume expansion. Additionally, the synthetic fiber 287 may be elasticity that it deforms when pressed.

The synthetic fiber 287 may be configured to absorb the fire extinguishing agent 321. The synthetic fiber 287 may include a super absorbent fiber formed by spinning super absorbent resin into a mesh shape. Here, the super absorbent resin may be configured to absorb the fire extinguishing agent (water) that is heavier by about 500 to 1,000 times than its weight. For example, the super absorbent resin may be a super absorbent resin product from LG Chem. For example, the synthetic fiber 287 may be made by simultaneously polymerizing acrylic acid and methyl acrylate as raw materials in water, extracting the resulting polymer and spinning in the shape of a mesh.

According to this configuration of the present disclosure, the sealing element 280 according to still another embodiment includes the synthetic fiber 287 configured to absorb a part of the fire extinguishing agent 321 and expand the volume to close at least a part of the opening P1 when the synthetic fiber 287 contacts the fire extinguishing agent 321 supplied into the module housing 210, thereby stably closing the opening P1 and maintaining the fire extinguishing agent 321 at the level of a predetermined height in the module housing 210. Furthermore, the synthetic fiber 287 may effectively reduce the amount of the fire extinguishing agent 321 leaking out of the opening P1, thereby helping the rapid fire extinguishing or cooling of the battery module 200.

Figure 13:
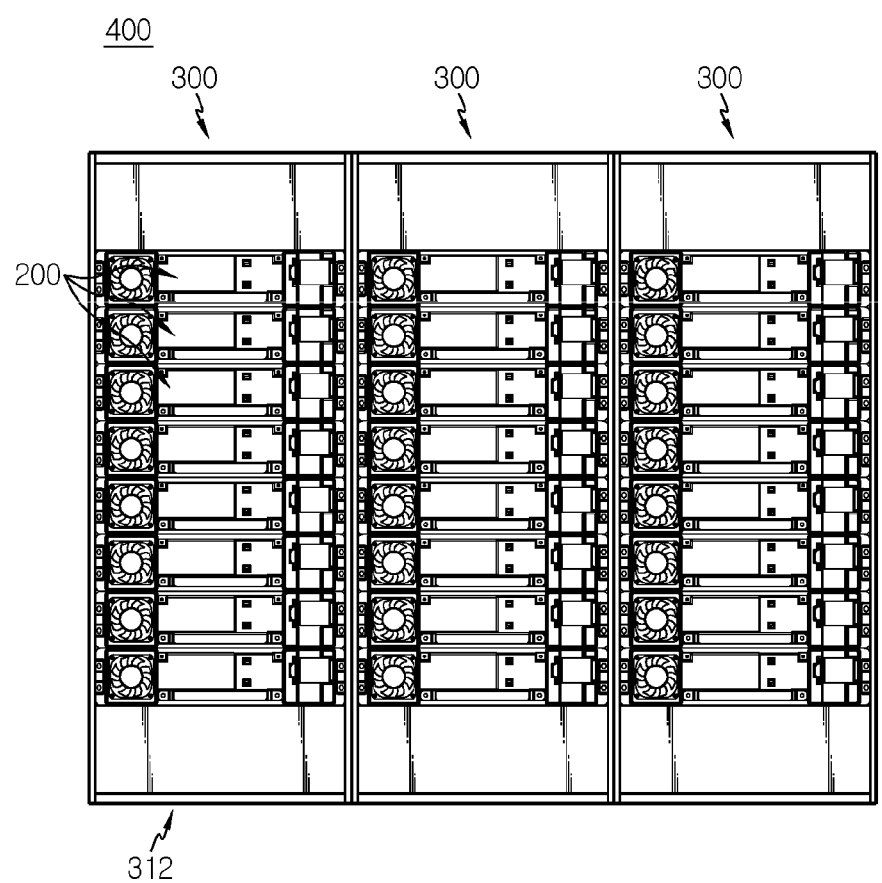
FIG. 13 is a schematic front view of an energy storage system according to an embodiment of the present disclosure.

FIG. 13 is a schematic front view of an energy storage system according to an embodiment of the present disclosure.

Referring to FIG. 13 together with FIGS. 2 and 8, the battery rack 300 according to the present disclosure may further include a rack BMS 350 inside or outside of a rack case 312 to transmit and receive information to/from the plurality of module BMSs 290.

The energy storage system 400 according to the present disclosure may include at least one battery rack 300 according to the present disclosure. In particular, the energy storage system 400 may include a plurality of battery racks 300 according to the present disclosure. Additionally, the plurality of battery racks 300 may be electrically connected to one another. The energy storage system according to the present disclosure may be embodied in various forms, for example, a smart grid system or an electric charging station.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

| | |
|---|---|
| 200: Battery module | 100: Cell assembly |
| 110: Secondary battery | 210: Module housing |
| 211: Gas passageway | 230, 230a, 230b: Adjustment cover |
| 270: Busbar assembly | 272, 276: Busbar, Busbar frame |
| P1, P1a, P1b: Opening, Inlet, Outlet | |
| 321: Fire extinguishing agent | |
| 280: Sealing element | 281: Cap |
| 283: Stopper | 285: Fixation cord |
| 287: Synthetic fiber | |
| 300: Battery rack | 312: Rack case |

What is claimed is:

1. A battery module, comprising:
a cell assembly including a plurality of secondary batteries;
a module housing in which the cell assembly is received in an internal space, the module housing having a bottom wall supporting the cell assembly, a top wall and a side wall extending between the bottom wall and the top wall, at least one opening in the side wall through which the internal space is in communication with an external space; and
an adjustment cover configured to cover at least a part of the at least one opening to fill a fire extinguishing agent supplied into the module housing to a predetermined height,
wherein a top edge of the adjustment cover is lower than a top edge of the at least one opening.

2. The battery module according to claim 1, wherein the adjustment cover is disposed outside of the at least one opening, and has an end connected to an outer surface of the module housing.

3. The battery module according to claim 2, wherein the adjustment cover has an open top.

4. The battery module according to claim 2, wherein the at least one opening includes an inlet through which outside air enters the module housing, and an outlet formed in a part of the module housing to allow inside air to exit, and
wherein the adjustment cover is provided at each of the inlet and the outlet.

5. The battery module according to claim 1, wherein the battery module is configured to supply the fire extinguishing agent into the module housing when an internal temperature of the module housing rises above a predetermined temperature, and
wherein the adjustment cover includes a sealing element configured to seal a top of the adjustment cover by the fire extinguishing agent supplied to the battery module.

6. The battery module according to claim 5, wherein the sealing element includes a cap configured to seal the top of the adjustment cover by buoyancy when the fire extinguishing agent is supplied to the battery module.

7. The battery module according to claim 6, wherein the sealing element further includes a stopper provided at a top of the adjustment cover to prevent the adjustment cover from being forced out of the adjustment cover by the fire extinguishing agent, and a fixation cord connected to the cap.

8. The battery module according to claim 5, wherein the sealing element includes a synthetic fiber configured to absorb the fire extinguishing agent and expand in volume to close at least a part of the opening when the synthetic fiber contacts the fire extinguishing agent supplied into the module housing.

9. A battery rack comprising the battery module according to claim 1 and a rack case in which the battery module is received.

10. An energy storage system comprising at least two battery racks according to claim 9.

11. The battery module according to claim 1, wherein the adjustment cover has a first wall spaced from the side wall of the module housing and a bottom and side that extend from the first wall to the side wall of the module housing.

12. The battery module according to claim 1, wherein the top edge of the at least one opening is below a top edge of the side wall.

* * * * *